Figure 1:
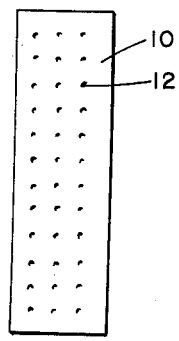

Sept. 22, 1959 E. E. ANDERSON ET AL 2,905,559
PROCESS FOR PREPARING A CORN CHIP PRODUCT
Filed Nov. 13, 1958

Edward E. Anderson
Philip G. Kiely
INVENTORS

BY *Bernie A. Lepper*

Attorney

2,905,559

PROCESS FOR PREPARING A CORN CHIP PRODUCT

Edward E. Anderson, Lexington, and Philip G. Kiely, Newtonville, Mass., assignors to Arthur D. Little, Inc., Cambridge, Mass., a corporation of Massachusetts Application November 13, 1958, Serial No. 773,625

3 Claims. (Cl. 99—80)

This invention relates to the production of a food product and more particularly to a food product consisting essentially of corn.

So-called corn chip products are known. Essentially their manufacture consists of boiling a mixture of white and yellow corn kernels in a water solution of lime and grinding the resulting boiled material to form what is termed a corn masa dough. This masa dough is then commonly extruded directly into heated oil in a deep fat fryer wherein the strips are cooked at temperatures ranging from 340 to 410° F. for varying lengths of time depending on the thickness of the extruded material and the temperature of the frying oil. After frying is completed the resulting corn chips are usually seasoned with salt and/or other seasonings.

When ground masa corn dough is handled in this conventional process, i.e. extruded directly into the frying medium, the resulting corn chips have varying lengths and widths and distorted shapes. Moreover, some of them tend to "pillow"—an effect sometimes called "souffleing."

An attempt to achieve constant size and shape in such a final corn chip product was made by rolling or sheeting out of the dough to a predetermined thickness, cutting into the desired shape and then frying. However, when the corn chips of various sizes prepared from masa dough were rolled out, cut and cooked, it was found that essentially all of these corn chip products pillowed. This pillowing was apparently due to the compressing and sealing effect achieved in the rolling process. That is, in rolling the dough the outer layers of the sheet of corn masa dough thus formed were sealed, and the water vapor formed in frying could not easily escape. Inasmuch as pillowing is undesirable, it was necessary to find a way in which this effect could be entirely eliminated.

It is therefore a primary object of this invention to provide a process whereby corn masa dough, formed and rolled into sheets and cut into desired sizes, may be processed to produce a corn chip product which has superior characteristics as far as appearance, flavor, and nutritional value are concerned. It is a further object of this invention to provide corn chip products, the size and shape of which may be carefully controlled. It is another object to provide such corn chip products which are essentially flat and hence more pleasing to the taste and less easily broken in handling. These and other objects will become apparent in the following discussion and description of this invention.

Figure 2:
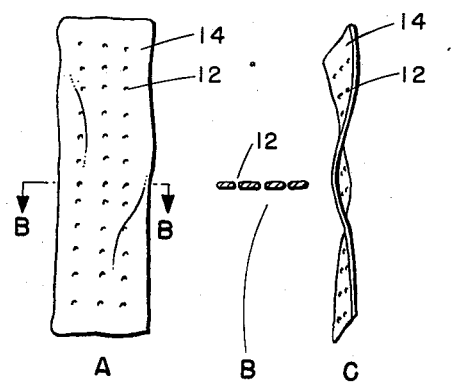
Figure 3:
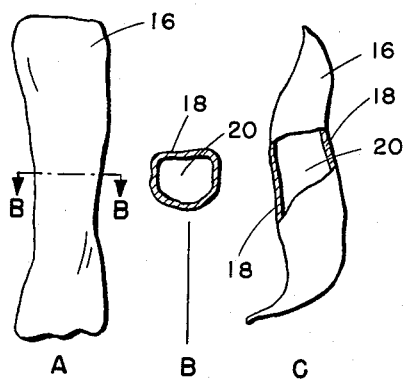

This invention will be further described with reference to the accompanying drawings in which:

Fig. 1 represents a top-plan view of a corn chip processed in accordance with the practice of this invention before cooking;

Fig. 2 includes top-plan, cross-sectional and side views of cooked corn chips made in accordance with this invention; and Fig. 3 includes top-plan, cross-sectional and side views of cooked corn chips made by a process not in accordance with this invention.

The corn chip products of this invention are formed by sheeting corn masa dough to a predetermined thickness, cutting into strips of a desired width and length and puncturing the dough so that the resulting perforations penetrate the corn masa dough from top through the bottom surface and are uniformly distributed throughout the entire corn masa strip. By thus perforating the corn masa dough after it is rolled out, all pillowing is eliminated and the resulting cooked corn chip product is crisp, flat, free from entrapped voids throughout, and pleasing to the taste.

With reference to the accompanying drawings, in Fig. 1 the uncooked masa strip 10 is seen to have perforations 12 uniformly disposed throughout. After cooking (e.g., deep fat frying) the corn chips (Fig. 2) remain essentially flat (Fig. 2B and 2C), possessing substantially the same dimensions (Fig. 2A) as the uncooked dough of Fig. 1. Moreover the perforations 12 of the uncooked strip of Fig. 1 remain as discrete holes in the cooked chip as illustrated in Fig. 2B.

In contrast to the essentially flat, dimensionally stable chips prepared in accordance with this invention are the chips of Fig. 3 which were similarly deep fat fried but not perforated prior to frying. Figs. 3A and 3C show the very distorted configurations the unperforated chips assume after frying. Instead of being essentially a flat chip of a fairly uniform thickness as those of Fig. 2, these chips have pillowed to almost the maximum degree without actually breaking. The side walls 18 are quite thin and the chips are essentially hollow throughout because of the relatively large voids 20.

The minor amount of curling shown in the chip made in accordance with this invention (Fig. 2C) is not at all objectionable. On the other hand, it gives a bit of interest to the form of the resulting corn chip product. What is important and is clearly shown in Fig. 2 is that the thickness of the finally cooked corn chip has remained essentially consistent throughout the entire chip.

It should also be pointed out that the hollow configuration of the chips of Fig. 3 provides a reservoir for fat from the frying medium to concentrate. This residual fat materially detracts from the palatability of the chips and requires a larger amount of frying medium for preparation than required for cooking the corn chips of this invention.

It has been found in the practice of this invention convenient to sheet out corn masa dough to a thickness between about three-fourths and three millimeters (i.e., between about 0.03 and 0.12 inch). The sheeted dough is then cut into strips ranging from about three-eighths to about one and one-quarter inches wide and from about one to three inches long. The perforations, to obtain a satisfactorily flat chip, should be not more than one-half inch apart and not less than one-eighth inch apart. The preferable distance between perforations is about three-sixteenths of an inch. Within these ranges the resulting corn ships resemble those illustrated in Fig. 2.

The perforations in the sheets of corn dough may be effected by passing the sheets of corn masa dough under a roller equipped with appropriate sharply pointed spikes. The perforated sheets may then be cut into the desired shape. Of course, the strips may be cut first and then perforated.

The size of the perforations made in the corn dough should not be so large as to materially weaken the final corn chip, nor so small that they do not serve their purpose in adequately preventing the build up of water vapor between the exterior layers of the corn chip, the process which is believed to cause pillowing. The diameter of the perforation will therefore vary with the dough, the thickness of the dough sheet and the final strength required in the chip produced. The perforation diameter may be determined from a few simple experimental runs and for this reason need not be further defined.

As an example, however, of perforation size, it may be noted that when masa dough was sheeted out to form strips about 1.5 mm. thick and perforations were placed about 3/16 inch apart, puncturing the dough was conveniently carried out by using spikes, the base or maximum diameter of which was 0.063 inch. These spikes were sharply pointed at that end which entered the dough sheet. The perforation size should be such, in any case, to prevent pillowing and to provide openings extending from one surface of the dough sheet and the finally cooked chip to the other surface. This means that appreciably all of the holes formed through the sheet of dough should remain as discrete holes after cooking.

After the sheet has been perforated and the strips cut to size they are cooked in fat, maintained at a temperature between about 340 to 410° F., for from about 1 to 3 minutes. Cooking is continued until the corn chip product is crisp and done and the moisture content of the chip is reduced to at least 2% or less. After cooking the corn chip may be salted or treated with other seasonings such as barbecue seasoning, celery, garlic, onions, cheese and the like.

The preparation of the dough is not a part of this invention and it may be prepared in any suitable way known in the art. Usually this consists of making a solution of lime in water and cooking a combination of yellow and white corn in this solution. Normally after boiling, the entire mixture will be permitted to steep for an extended period of time. After grinding the steeped material, it is ready to use as dough.

The following example is given to better illustrate the process of this invention. It is meant to be illustrative, but not limiting.

*Example I*

Ten pounds of a mixture of dried white and yellow corn, 1.45 ounces of U.S.P. grade calcium hydroxide and 18.5 pounds of water were boiled for about 25 minutes and then a small quantity of cold water was added to stop the cooking process. The resulting mixture was then steeped for approximately 20 hours and subsequently ground to give about 18 pounds of corn masa dough.

The corn masa dough was then rolled out to form sheets aproximately 1.5 mm. thick, cut into individual pieces three-quarters inch wide and one and one-half to two inches long. The dough strips were then punctured with spikes having a diameter of 0.063 inch and being sharply pointed at the end. The spikes were so adjusted that the perforations resulting in the dough strip were approximately three-sixteenths inch apart. The perforated strips were then deep fat fried for from one to two minutes, the frying liquid being maintained between about 390 and 400° F. The final residual moisture in the cooked corn chips was less than 2% by weight of the chips.

A variety of flavoring substances such as garlic, onions, cheese and the like was deposited on the surface of different chip samples. The resulting chips were crisp, strong enough to dip into various mixtures, such as softened cream cheese, and exceedingly pleasing to the palate.

The corn chip product of this invention, by virtue of the fact that it has been formed wtihout pillowing (i.e., has an essentially constant thickness throughout) possesses a number of important advantages over corn chip products formed by the commonly known processes of the prior art described above. The corn chip product of this invention possesses a more pleasing and interesting appearance, being brighter in color and less greasy in content. It has, moreover, a greater structural strength and can be formed in uniform shapes and sizes. Its greater structural strength makes it well suited as a food product to eat with "dips," e.g., cream cheese, clam dips, and the like. It has been found that corn chips made in accordance with this invention will cook faster, use less oil and hence result in a product which is more economical to produce, which is better flavored and which possesses a lower caloric content. In addition, the perforations remaining in the final corn chip serve as reservoirs when seasonings are added, while the small variation in thickness which occurs between the perforations will result in a more tender and flaky product.

We claim:

1. Process for preparing corn masa dough suitable for cooking, characterized by the step of puncturing corn masa dough in sheet form to provide in said sheet substantially uniformly disposed perforations spaced from about one-eighth to one-half inch apart, said perforations extending from one surface of said sheet to the other and being of such a dimension that substantially all of them will remain as discrete perforations after said cooking.

2. Process for the preparation of an edible corn product, comprising the steps of sheeting out corn masa dough, then cutting and perforating the resulting sheet of dough to form individual pieces having perforations extending through each piece from one surface to the other, and finally cooking said pieces to form a crisp, perforated corn product, said perforations being of such a dimension that substantially all of them will remain as discrete perforations after said cooking.

3. Process for the preparation of an edible corn product, comprising the steps of sheeting out corn masa dough to a thickness ranging from about three-fourths to three millimeters, then cutting and perforating the resulting sheet of dough to form individual pieces having perforations spaced from about one-eighth to one-half inch apart and extending through each piece from one surface to the other, and finally cooking said pieces to form a crisp, perforated corn product, said perforations being of such a dimension that substantially all of them will remain as discrete perforations after said cooking.

References Cited in the file of this patent

UNITED STATES PATENTS

| | | |
|---|---|---|
| 2,002,053 | Doolin | May 21, 1935 |
| 2,825,649 | Stahmer | Mar. 4, 1958 |

OTHER REFERENCES

Biscuit and Cracker Production, 1957, by Bohn, American Trade Publishing Co. (New York), pp. 92, 93, 105, 108.